2 Sheets—Sheet 1.

D. SWANGER, Dec'd.

LIZZIE SWANGER, Administratrix. Said DAVID SAWNGER Assignor of two-thirds to WILLIAM BETZ and ANTON HAMMERLY.

FODDER CUTTER.

No. 11,010. Reissued July 2, 1889.

Witnesses:
Edw. Smith
A. J. Fulmer

Inventor:
David Swanger
Lizzie Swanger
Administratrix
By Bond & Wills
Attys

N. PETERS, Photo-Lithographer, Washington, D. C.

2 Sheets—Sheet 2.

D. SWANGER, Dec'd.

LIZZIE SWANGER, Administratrix. Said DAVID SAWNGER Assignor of two-thirds to WILLIAM BETZ and ANTON HAMMERLY.

FODDER CUTTER.

No. 11,010. Reissued July 2, 1889.

Witnesses:
E. A. Schmitt
A. J. Fulmer

Inventor:
David Swanger
by Lizzie Swanger
Administratrix
By Bond & Mise
Attys.

N. PETERS, Photo-Lithographer, Washington, D. C.

UNITED STATES PATENT OFFICE.

LIZZIE SWANGER, OF CANTON, OHIO, ADMINISTRATRIX OF DAVID SWANGER, DECEASED; SAID DAVID SWANGER ASSIGNOR OF TWO-THIRDS TO WILLIAM BETZ AND ANTON HAMMERLY, OF SAME PLACE.

FODDER-CUTTER.

SPECIFICATION forming part of Reissued Letters Patent No. 11,010, dated July 2, 1889.

Original No. 352,960, dated November 23, 1886. Application for reissue filed April 4, 1888. Serial No. 269,627.

*To all whom it may concern:*

Be it known that DAVID SWANGER, late a citizen of the United States, residing at Canton, in the county of Stark and State of Ohio, did invent certain new and useful Improvements in Fodder-Cutters; and I do hereby declare that the following is a full, clear, and exact description of the same, reference being had to the annexed drawings, making a part of this specification, and to the letters and figures of reference marked thereon, in which—

Figure 1:
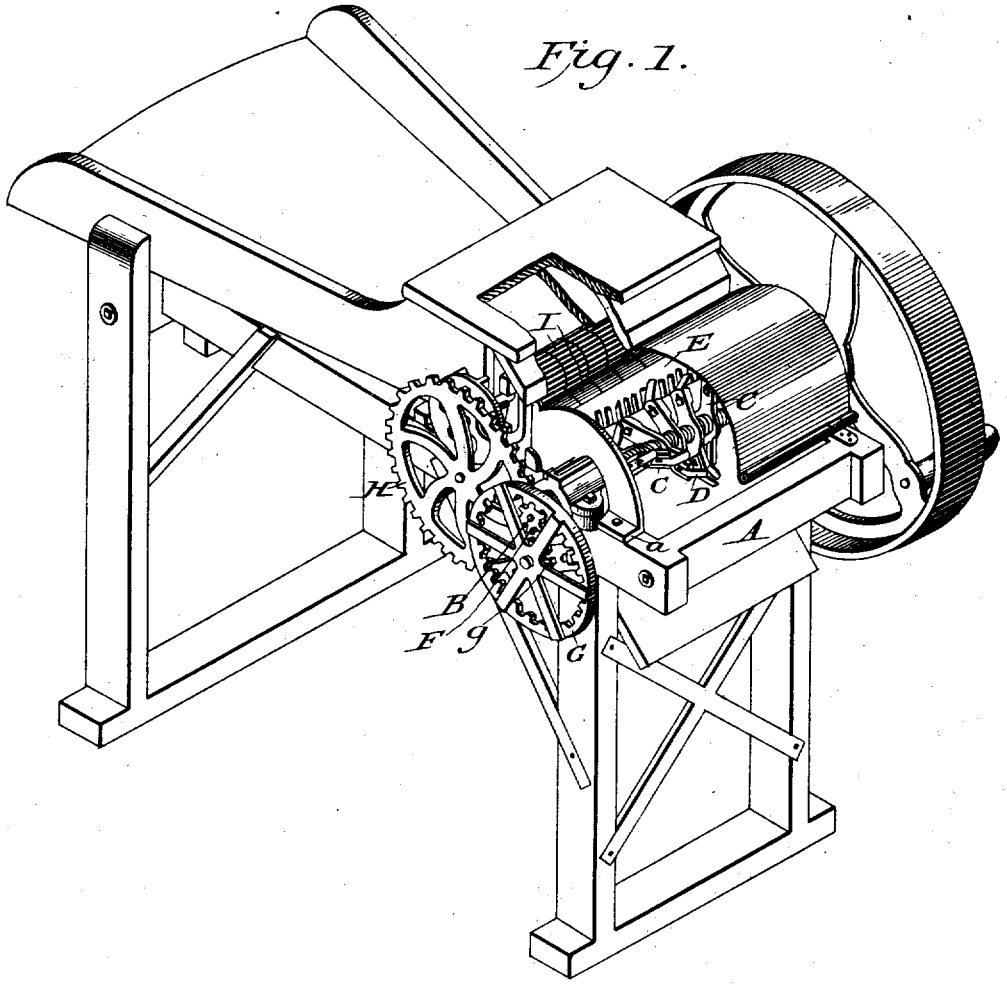
Figure 7:
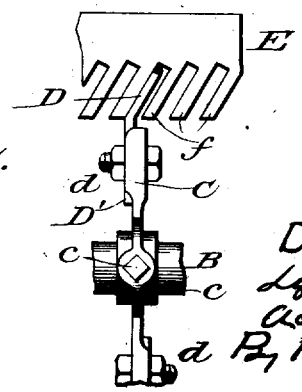
Figure 2:
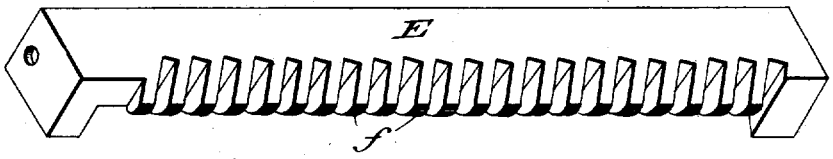
Figure 3:
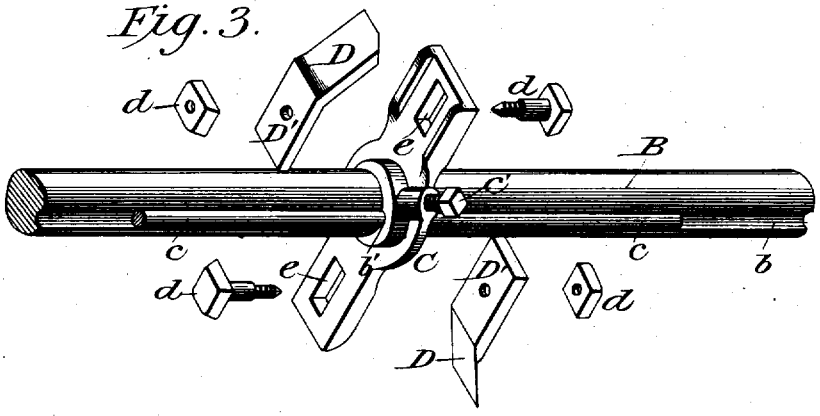
Figure 4:
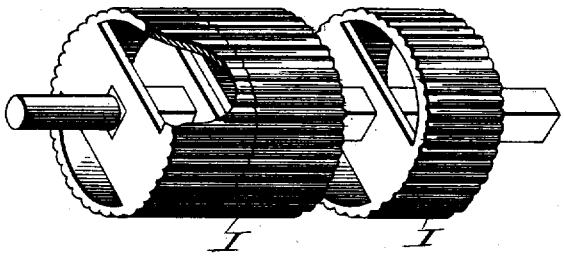
Figure 5:
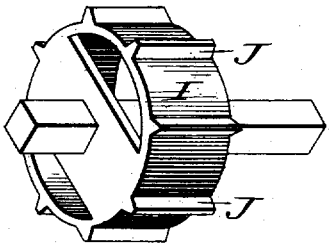
Figure 6:
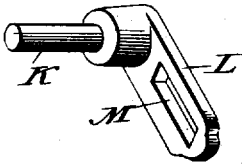

Figure 1 is a perspective view of the improved straw-cutter, parts being broken away. Fig. 2 is a detached view of the cutter-bar. Fig. 3 are detached views of the main shaft, showing one of the rotary arms attached thereto and the knives placed in position to be properly attached to said rotary arm. Fig. 4 is a detached view of a portion of the lower feed-shaft, showing three sections of the feed-rollers located thereon. Fig. 5 is a detached view of a portion of the upper feed-shaft, showing a section of a feed-roller located thereon. Fig. 6 is a detached view of the bracket and pin for changing the speed of the rollers. Fig. 7 is a top view of a portion of the cutter-bar and one of the rotary arms properly located on the main shaft.

The present invention has relation to fodder-cutters; and it consists in the different parts and combination of parts hereinafter described, and particularly pointed out in the claims.

Similar letters of reference indicate corresponding parts in all the figures of the drawings.

A represents the frame, which may be substantially of the form shown in Fig. 1, and, as shown, is properly braced, so as to rigidly hold the same.

To the front or forward end of the frame A are securely attached the plates or bars *a*, said plates or bars being provided with suitable bearings for the main shaft B, said shaft B being located substantially as shown in Fig. 1. To this main shaft B are attached the arms C, and for the purpose of preventing the arms C from turning on the shaft B, said shaft is provided with the groove or recess *b*, and the arms C are provided with a corresponding recess *b'*, and the locking-rod *c* placed in the position shown in Fig. 3 and for the purpose of securely holding the arms C.

At a given place on the main shaft B the set-screws *c'* are provided, as shown in the drawings. To the ends of the arms C are adjustably attached the knives D. Said knives are substantially of the form shown in the drawings, and are securely attached to the arms C by means of the clamping bolts and nuts *d* or their equivalents. For the purpose of adjusting the knives D in or out from the main shaft B, the slots *e* are provided, as shown in the drawings. The knives D are substantially of the form shown, and, as shown, are provided with the shanks D', which are integral with the knives D, the knives D being at an angle to the shanks, and when properly attached to the arms C will be at an angle to said arms. The arms C are placed spirally on the main shaft B, as shown in Fig. 1. The object and purpose of so placing the arms C are that but one knife will cut at any one time, thereby causing the fodder to be cut much easier.

The cutter-bar E is substantially of the form shown in Figs. 1, 2, and 7, and is securely held in proper position by means of clamping-bolts or their equivalents. It is preferred to attach the cutter-bar to the plates or bars *a*. This cutter-bar E is provided with diagonally-arranged teeth *f*, which are formed integral with the bar E. The teeth *f* are so adjusted that their side faces will be in line with the knives D when said knives pass between them. The knives D are placed upon opposite sides of the arms C, as illustrated in Fig. 3, so that the two knives upon one of the arms will pass between two of the teeth *f*.

It will be seen that by means of the set-screws *c'* the arms C can be moved to any desired position on the shaft B when said set-screws are loosened, thereby moving the knives D to or from the teeth *f*, and thereby regulating the cutting capacity for different kinds of fodder. To one end of the shaft B is rigidly attached the pinion F, which meshes into the wheel G.

To the side of the wheel G is attached or placed the pinion *g*. This pinion *g* may be formed integral with the wheel G, or it may be formed separate and attached in any well-known manner. The pinion *g* communicates motion to the wheel H, which is rigidly attached to the lower feed-roller shaft, as shown in Fig. 1, motion being communicated to the upper feed-roller shaft by means of ordinary finger gear-wheels. The wheel G and pinion *g* are mounted on a stud or pin K, projecting from one end of a bracket L, having a slot M for passage of a screw, by which it can be adjustably attached to the machine-frame.

The feed-rollers I are formed in sections and strung on the shafts, as shown in Figs. 1, 4, and 5. The rollers I, designed and calculated for the lower shaft, are fluted or corrugated, as shown in the drawings. The rollers designed and calculated for the upper shaft are provided with the ribs J, which are located substantially as shown.

It will be seen that by forming the feed-rollers I in sections machines of different widths can be made by increasing or decreasing the number of sections. It will be understood that the feed-rollers proper should be pressed against each by means of springs.

For the purpose of changing the speed of the feed-rollers I, the pinion *g* may be formed of different diameters and adjusted to the wheel H by moving the pin K, on which the pinion *g* turns, to or from the wheel H. For this purpose the pinion *g* is preferably made separate from the wheel G, but capable of being secured thereto in any suitable manner.

Having now fully described the invention, what is claimed as new, and desired to be secured by Letters Patent, is—

1. The combination, with the diagonally-toothed cutter-bar E, of the rotary shaft B, the arms C, connected in pairs by collars and adjustably secured to said shaft in different planes, thereby forming a spiral thereon, and the knives D, adjustably secured to the ends of said arms with their cutting-edges standing at an angle thereto, substantially as described.

2. The combination of the feed-rollers I, the toothed cutter-bar E, the rotary shaft B, having pinion F, the arms C, mounted on said shaft and provided with knives D, the adjustable bracket L, having slot M and stud K, the wheel G and pinion *g*, mounted on said stud, and the wheel H, attached to the lower feed-roller, substantially as described.

3. In a fodder-cutter, the combination, with the cutter-bar provided with diagonally-arranged teeth, of the main shaft, arms attached thereto and arranged spirally thereon, and knives attached to and set at an angle to said arms, substantially as described.

In testimony that I claim the above as the invention of David Swanger, deceased, I have hereunto subscribed my name this 29th day of February, 1888, in presence of two witnesses.

LIZZIE SWANGER,
*Administratrix of David Swanger, deceased.*

Witnesses:
H. W. SWANGER,
FLORENCE SWANGER.